May 11, 1948. H. STEINHAUS 2,441,538
METHOD OF AND APPARATUS FOR LOCALIZING AND VISUALIZING FOREIGN BODIES
Filed March 6, 1939 2 Sheets-Sheet 1

Inventor
Hugo Steinhaus
by
S. Sokal.
attorney

May 11, 1948.  H. STEINHAUS  2,441,538
METHOD OF AND APPARATUS FOR LOCALIZING AND VISUALIZING FOREIGN BODIES
Filed March 6, 1939  2 Sheets-Sheet 2

Inventor:
Hugo Steinhaus
by S. Sokal,
Attorney.

Patented May 11, 1948

2,441,538

UNITED STATES PATENT OFFICE 2,441,538

METHOD OF AND APPARATUS FOR LOCALIZING AND VISUALIZING FOREIGN BODIES

Hugo Steinhaus, Lwow, Poland

Application March 6, 1939, Serial No. 260,102
In Poland March 8, 1938

Section 3, Public Law 690, August 8, 1946
Patent expires March 8, 1958

10 Claims. (Cl. 250—59)

This invention relates generally to foreign body localisation, and, more particularly, to such localisers as are employed for the localisation of foreign bodies or organs by means of X-rays, more particularly by throwing a shadow of the foreign body on a screen by a source of X-rays. The invention is particularly intended as an aid to a surgeon, the object of the invention being to enable the surgeon to see, during a surgical operation, the exact position of the foreign body in the patient's body.

The main object of the invention is to provide for an additional step, after localisation of the foreign body had been effected by a projection of the body upon the screen, which consists in placing a semi-transparent mirror in such a position that the part of the patient's body to be operated upon can be seen by the surgeon in the mirror, and placing behind the mirror a visible marker consisting of a resplendent small sphere or a small electric lamp symmetrically to the foreign body previously located. Consequently, when looking through the mirror, the surgeon will see in the mirror the part of the patient's body on which he is to operate and the reflection of the visible marker in exactly the position which the foreign body occupies in the patient's body.

A further object of the invention consists in providing a means for holding the semi-transparent mirror and the visible marker which enables the mirror and the marker to be adjusted to the most convenient position for viewing before and during the operation.

A further object of the invention is to mount the mirror and the visible marker in such a manner that the distance of the mirror from the patient's body and the distance of the visible marker from the mirror can be simultaneously adjusted, that is, increased or decreased.

A further object of the invention is to provide an improved apparatus in which a support carrying the mirror and the visible marker are so mounted upon an adjustable frame supporting a source of X-rays and a screen, that, in the final position of said frame, the support carrying the mirror and the marker is already in the required position. In other words, the support for the mirror and the visible marker is so mounted upon the frame carrying the source of X-rays and the screen that, in the final position of said frame, the axis of a fulcrum carried by the frame on which the support is rotatably mounted, passes through the foreign body and a line connecting the source of X-rays with a locating mark on the screen also passing through the foreign body.

The accompanying drawings illustrate two methods and apparatus for carrying out the invention by way of example.

Fig. 2 is a front elevation of the apparatus, Fig. 3 is a side elevation of the apparatus in the first viewing stage, Fig. 4 is a top view of the screen, and Fig. 5 is a partial view of the semi-transparent mirror.

Figure 1:
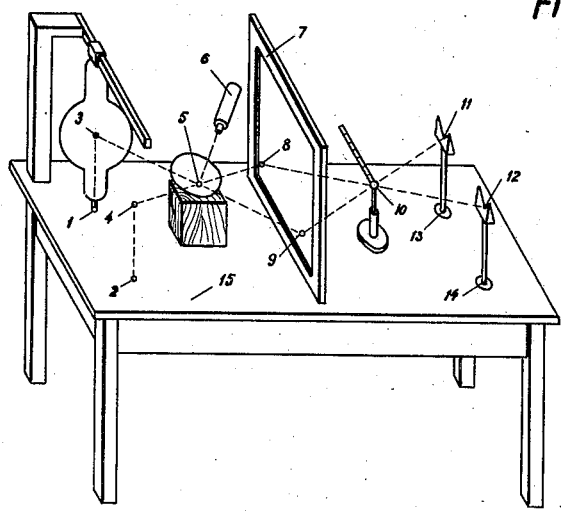
Fig. 1 is a diagrammatic perspective general view illustrating the first apparatus and method.
Figure 2:
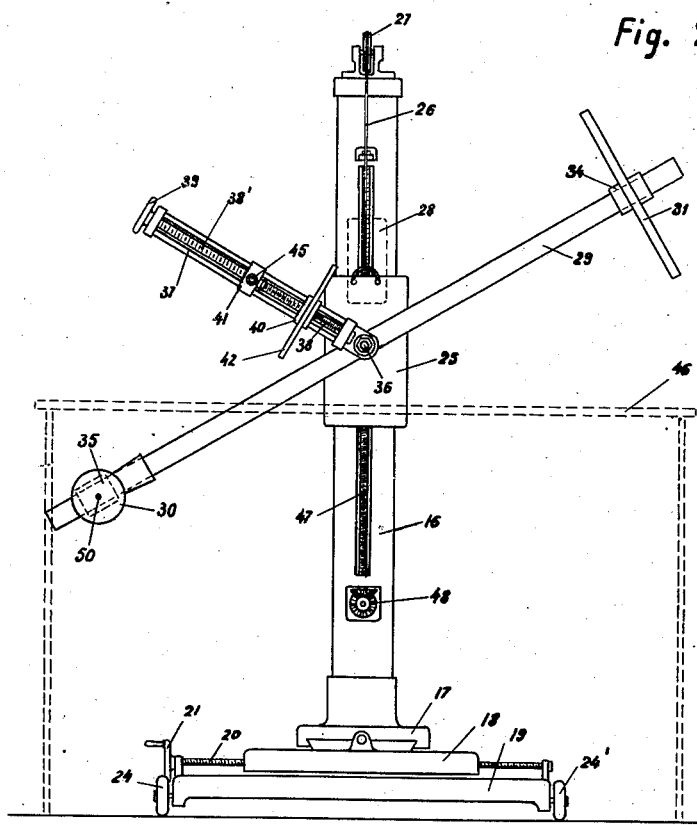
Figs. 2 to 5 illustrate the second method and apparatus.
Figure 4:
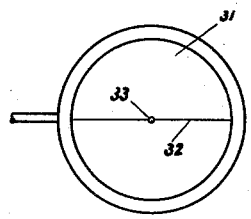
Figure 3:
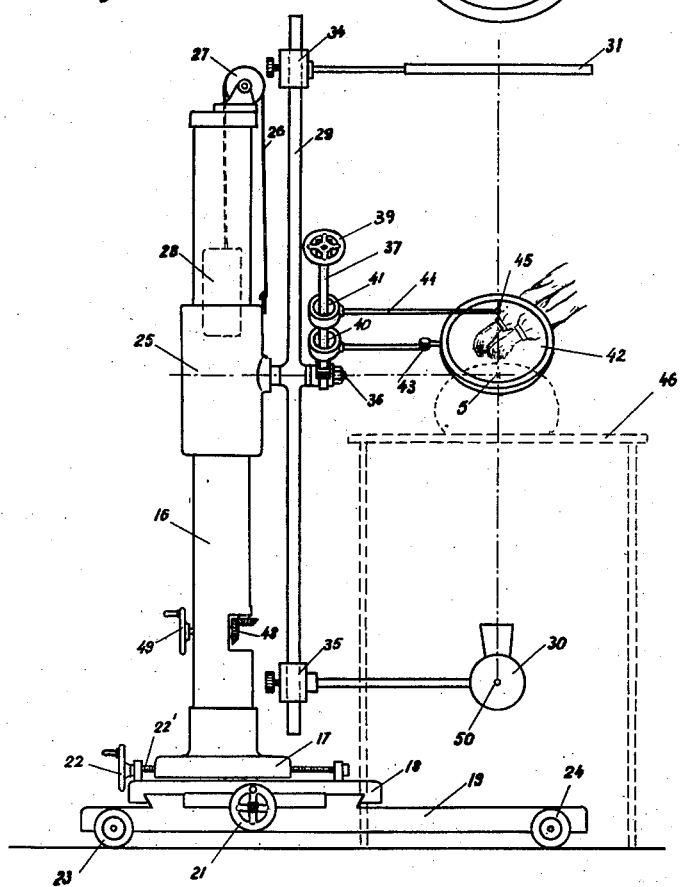
Figure 5:
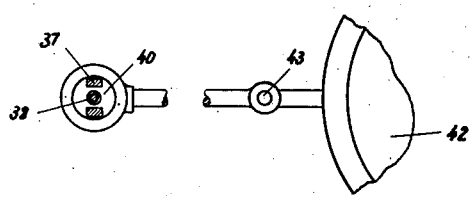

As may be seen from Fig. 1, the method of procedure consists in that two X-ray tubes with foci 3 and 4, placed above the base points 1 and 3, or else one tube, once in the position 3 and the other time in the position 4, are arranged before the X-ray screen 7, while between the tubes with foci 3, 4 and the screen 7 there is placed an object 5, for instance the point of a metal projectile inside of a surrounding mass which may, be the skull or another part of the human body. Symmetrically to 3 and 4 with regard to the screen 7, i. e. on the other side of the screen, there are arranged visors 11 and 12 on stationary or movable supports 13 and 14. Between the screen 7 and the visors 11, 12 there is placed a movable marker 10, in the form of a shining sphere or a small electric lamp movable along a wire.

The X-ray tubes with foci 3 and 4 project on the screen 7 images 8 and 9 of the object 5. In order to adjust the mark 7 symmetrically to the object 5 with regard to the screen 7, one views first of all the image 8 from the visor 12, and then the image 9 from the visor 11, after which the marker 10 is adjusted in the intersection of lines 9—11 and 8—12. Following this adjustment, the screen 7 is removed and a semi-transparent mirror is placed instead. The mirror may be a smooth plate which partly reflects the rays as a mirror, and partly transmits them as a glass plate.

When observing the mirror from the righthand side (Fig. 1), one sees through this mirror, the patient's head, and simultaneously, as a reflected image in the plate, the mark 10 inside of the head, exactly in the spot of the point 5 of the projectile. The operating surgeon can, therefore, reach beyond the plate replacing the screen 7, and mark, on the forehead on the patient a point in the closest proximity to the sharp point 5. For making measurements, the sphere or electric lamp 10 is preferably placed in the zero position of the movable scale which can be so adjusted as to enable seeing in the mirror the distance on the scale between point 10 and the marker previously marked. The operating surgeon can also adjust the surgical tool 6 in the direction 5; he can likewise pass on the side of the patient, mark an arbitrary point on the patient's body, and check in the mirror what is the distance between the image of the marked point and marker 10.

The visors 11, 12 become superfluous if the resplendent marker 10 is so adjustably arranged by means of appropriate devices with regard to the screen 7, or to the semi-transparent mirror as to be always in a symmetric position to the object 5 to be located, with regard to the screen. It is also possible to adjust the mirror in another plane than that of the screen, if only the marker 10, after suitable adjustment of the screen and of the semi-transparent mirror, always remains in symmetry to the object to be located, with regard to the plane of the semi-transparent mirror.

Since the system shown in Fig. 1 is not suitable for executing many surgical operations on account of the insufficient access of the surgeon to the patient, I have constructed an apparatus operating on the principle mentioned, and shown in Fig. 2-5. This apparatus, called "introvisor," furnishes easy manipulating to the surgeon during the operation, with the use of only one X-ray tube. The apparatus consists of a chassis carrying a vertical column 16 upon one of two supports 18 and 17; the lower support 18 can be moved on the base plate 19 longitudinally with regard to the operation table 46, while the support 17 can be moved on the support 18 transversally to said table 46, the movement of the support 18 with regard to the chassis plate 19 being effected by means of a screw 20 provided with a crank 21, and the shifting of the support 17 with regard to 18 being effected by means of a screw 22' actuated by crank 22. The chassis plate 19 is provided with wheels 23, 24, 24' on which it can be easily transported.

When in use, the apparatus rests on screws not shown in the drawing, and, after lowering the apparatus on wheels 23, 24, 24', it can be easily moved from one place to another.

On the column 16 there is movably mounted a socket 25 the weight of which can be counterbalanced by a counterpoise 28 placed inside of the column 16 and connected with the socket, by means of a rope 26 put around the upper stationary pulley 27. For moving the socket 25 upwards and downwards the column 16, any known device may be applied; for instance a vertical screw 47 which can be rotated by means of a toothed gearing 48 and a crank 49. Connected with the socket 25 is a pivot 36 on which a bar 29 is rotatably mounted. In the proximity of one of the ends of this bar is placed the X-ray tube 30 connected with the bar 29 by means of a slide 35 movable along the bar 29, and capable of being fixed on the bar by means of a suitable clamp screw. In the neighbourhood of the other end of the bar 29 there is arranged a small slide 34 connected with the X-ray screen 31 (Fig. 4) having a drawn line 32 and a locating mark 33 marked thereon, by means of a phosphorescent point. The X-ray tube 30 and the screen 31 can be moved along the bar 29 by means of slides 34 and 35. The line which connects the focus of the X-ray tube 30 with point 33 is parallel to the edge of the bar 29.

On the pivot 36 there is rotatably mounted an arm 37 carrying the semi-transparent mirror 42 and the mark 45 necessary for locating purposes. The mirror 42 is connected by means of the joint 43 with a rod movable by means of the slide 40 along the arm 37, and the marker 45, in the form of a shining sphere, is connected by means of the arm 44 with another slide 41 movable along the arm 37. The arm 37 has a circular cross section, owing to which the mirror 42 and the marker 45 can be rotated around the axis of the arm 37. Besides, the mirror 42 and the marker 45 are so movable along the arm 37 that the distance between the plane of the mirror 42 and the axis of the pivot 36 is always half as great as the distance of the marker 45 from said axis. A suitable mechanism can be used for attaining this purpose, for instance a screw mounted within the arm 37 and cooperating with the nuts connected by the slide which carries the mirror 42, the thread of the first part 38 of the screw being twice smaller than the thread of the second part 38' of the screw. The joint 43 serves for enabling the mirror 42 to be tilted backwards during a surgical operation until a position is attained which is convenient for the operating surgeon.

If a projectile 5 is to be located and visualised inside of the body of a patient placed on the table 46, this location is performed in the following manner. The apparatus called "introvisor" is gradually brought towards the operation table 46, the tube 30 being under the table and the screen 31 above the table. The bar 29 should be placed originally in a vertical position, i. e. parallel to the direction of the movement of the socket 25. After the ends of the chassis screws have been lowered and the chassis plate 19 has been consequently fixed, the column 16 is adjusted by rotating the cranks 21 and 22 and by shifting in both directions until the X-ray image of the object 5 exactly coincides with the point 33 of the screen 31. Now, the bar 29 is brought by rotating into any inclined position (Fig. 2), and the socket 25 together with parts attached thereto is shifted by means of the crank 49 until the image of the object 5 arrives in this new position again at the point 33. Simple geometrical considerations lead to the conclusion that this condition is fulfilled when the point 5 is placed on the prolonged axis of the pivot 36 of the apparatus. Point 5 will be then on the intersection of rays connecting the focus of the tube 30 with the point 33 in both positions of the bar 29. When the apparatus is in the position, one sees always when viewing through the semi-transparent mirror 42, the image of the marker 45 in the spot of the point 5 in which the point of the projectile is placed. The arm 37 can be, obviously, adjusted at any angle on the pivot 36, whereby the position of the reflection image of the marker 45 in the patient's body is not changed.

It follows from the aforesaid, that in the apparatus in accordance with Figs. 2-5 there has been applied, instead of the two tubes as in the basic sketch in Fig. 1, only one tube 30, without the necessity of marking on screen 31 the result of the first X-raying since the same point corresponds to either X-raying. Since the optical axis of the tube 30 is always directed towards the centre of the screen 31 and perpendicularly to the screen, the orientation of the X-ray image is very simple. The mobility of the mirror 42 is another factor facilitating the use of the apparatus. The screen 31 can be provided with a light-proof bag, the so-called "cryptoscope," which facilitates the observation of the screen.

After the location has been executed, the bar 29 can be adjusted without touching the mirror 42, so as not to hinder the surgeon. Screen 31 can likewise be swung backwards in the horizontal plane.

I claim:

1. In a method of locating a foreign body inside of an enveloping body by X-ray projection upon a screen consisting in first locating said foreign body by two projections at different angles upon a screen, the additional step consisting in placing a semi-transparent mirror so that the enveloping body, together with the foreign body, can be viewed in the mirror, and placing a visible shiny marker behind the mirror symmetrically to the located foreign body, whereby the operator, when viewing through the mirror, will see the enveloping body and within said body the reflection image of the visible marker exactly in the spot occupied by the foreign body in the enveloping body independently of the vision angle under which the mirror is seen by the observer.

2. A method of locating and visualising a foreign body or organ hidden inside of an enveloping body, consisting in first locating said foreign body by two projections at different angles upon a screen; viewing said projections at angles corresponding to the angles of the X-ray projections; substituting for the screen a semi-transparent mirror and placing a visible marker before the mirror at a point symmetrical to the foreign body behind the mirror said point lying at the intersection of the lines of viewing the projections upon the screen.

3. A method of locating and visualising a foreign body hidden inside an enveloping body, consisting in placing the enveloping body, together with the foreign body, upon a table; projecting by X-rays a picture of said body to register with a locating mark upon a screen, said source of X-rays and screen being mechanically connected; turning said source of X-rays and screen, connected therewith, about a pivot and adjusting same by moving said pivot parallel to the direction of the first projection until the projection of the foreign body upon the screen again registers with the locating mark of the screen, thereby placing the axis of the pivot through a line passing through the foreign body, and subsequently placing a semi-transparent mirror in a position in which the enveloping body and foreign body can be viewed in the mirror and placing a visible marker before said mirror in a position symmetrical to that of the foreign body behind the mirror.

4. A method of locating and visualising a foreign body hidden inside an enveloping body, consisting in placing the enveloping body upon a table; passing X-rays from a source of X-rays located under said table in a certain direction through the foreign body and a locating mark on a screen located above said foreign body; turning both the source of X-rays and the screen about a common axis and causing said common axis of rotation to pass through the foreign body by moving both the source of X-rays and the screen in a direction parallel to the direction of the first projection and placing a semi-transparent mirror in a position convenient for viewing by the operator, and placing a visible shiny marker before said mirror so that said marker lies in the plane passing through the two directions of projection at the intersection of the lines of projection, the distance of the mirror from the foreign body and the distance of the visible mark from the back of the mirror being the same at the intersection of the lines of projection.

5. Apparatus for locating and visualising a foreign body within an enveloping body, comprising in combination: a table upon which the enveloping body and foreign body are placed; a screen; means for projecting the image of the foreign body by X-rays at two different angles upon said screen; means for viewing said projections from the other side of the screen at angles corresponding to the angles of the projection; a visible shiny marker; means for placing said marker at the point of intersection of the two lines of viewing; and a semi-transparent mirror placed in the position originally occupied by the screen.

6. Apparatus for locating and visualising a foreign body within an enveloping body comprising in combination: a table upon which the enveloping body and the foreign body are placed; a platform; a column mounted upon said platform; means for moving said column relatively to said platform in all directions; a support slidably mounted by means of a sleeve upon said column and carrying at one end a source of X-rays and at the other end a screen provided with a locating mark; said support being pivotally mounted upon said sleeve; a member turnable about the pivot of the support; a semi-transparent mirror mounted upon said member at a certain radial distance from said pivot; and a shiny visible marker mounted upon said member at an equal radial distance before the mirror.

7. Apparatus for locating and visualising a foreign body within an enveloping body comprising in combination: a table upon which the enveloping body and the foreign body are placed; a platform; a column mounted upon said platform; means for moving said column relatively to said platform in all directions; a support slidably mounted by means of a sleeve upon said column carrying at one end a source of X-rays and at the other end a screen provided with a locating mark; said support being pivotally mounted upon said sleeve; a member turnable about the pivot of the support; a semi-transparent mirror mounted upon said member at a certain radial distance from said pivot; and a shiny visible marker mounted upon said member at an equal radial distance before the mirror; and means for simultaneously moving said semi-transparent mirror and said visible marker upon said member so that the semi-transparent mirror is always half-way between said visible marker and the axis of the pivot.

8. Apparatus for locating and visualising a foreign body hidden inside an enveloping body of the kind referred to comprising in combination: a source of radiation; a screen; a support which is rotatable about a pivot and adjustable in height for carrying said source of radiation and said screen, said screen being provided with a locating mark; a support carrying a visible marker and a semi-transparent mirror, rotatable about the same pivot, said visible marker and said semi-transparent mirror being so mounted upon said rotatable support that the distance between the mirror and the axis of rotation of said support is half the distance between the visible marker and said axis.

9. Apparatus for locating and visualising a foreign body inside an enveloping body of the kind referred to, comprising in combination: a table on which the enveloping body and foreign body are placed; a source of radiation; a screen provided with a locating mark; a plate which is simultaneously transparent and reflecting; a visible luminous marker; a support for said source of radiation and said screen; a support for said transparent and reflecting plate and said visible marker; means upon said support for adjusting said marker and said mirror in such a manner that the distance of the mirror from the axis of the pivot is always half the distance of the luminous marker and the axis of the pivot; a sleeve carrying upon a pivot both the support for the source of radiation and the screen and the support for the mirror and a visible marker; a column upon which said sleeve is slidable; and means for moving said column in all directions towards and from said table.

10. Apparatus for locating and visualising a foreign body inside an enveloping body of the kind referred to, comprising in combination: a table upon which said enveloping body and foreign body are placed; a platform movable relatively to said table; a column upon said platform; means for moving said column in two directions at right angles to one another upon said platform; a sleeve slidable vertically upon said column; means for sliding said sleeve upon said column; a pivot provided upon said sleeve at right angles to said column; a carrier turnable upon said pivot, said carrier carrying at one end a source of radiation and at the other end a screen provided with a locating mark; a support also turnable upon the same pivot; an arm upon said carrier carrying a semi-transparent mirror; another arm upon said carrier carrying a visible luminous marker; means for adjusting said luminous marker and said semi-transparent mirror upon said carrier in such a manner that the distance of the mirror from the axis of the pivot is always half the distance of the luminous marker and the axis of the pivot.

HUGO STEINHAUS.

REFERENCES CITED

The following references are of record in the file of this patent:

UNITED STATES PATENTS

| Number | Name | Date |
|---|---|---|
| 661,385 | Remy | Nov. 6, 1900 |
| 870,506 | Gillet | Nov. 5, 1907 |
| 1,370,640 | Granger | Mar. 8, 1921 |
| 2,115,096 | Cleary | Apr. 26, 1938 |

FOREIGN PATENTS

| Number | Country | Date |
|---|---|---|
| 369,662 | Geat Britain | Mar. 24, 1932 |
| 487,389 | Great Britain | Aug. 26, 1936 |